United States Patent [19]

Mann

[11] Patent Number: 5,069,304

[45] Date of Patent: Dec. 3, 1991

[54] REVERSE DRIVE FOR A MOTORCYCLE

[76] Inventor: Glenn E. Mann, 122 Sherlake Rd., Knoxville, Tenn. 37922

[21] Appl. No.: 321,784

[22] Filed: Mar. 10, 1989

[51] Int. Cl.⁵ ............................................. B62D 61/02
[52] U.S. Cl. .................................... 180/221; 180/65.3
[58] Field of Search ............... 180/219, 220, 221, 368, 180/342, 19.1, 205, 11, 69.6, 65.2, 65.3; 280/DIG. 14

[56] References Cited

U.S. PATENT DOCUMENTS 4,014,402  3/1977  Muto ............................... 180/342 X
4,974,695 12/1990  Politte .................................. 180/221

FOREIGN PATENT DOCUMENTS 2170458  8/1986  United Kingdom ................ 180/221
2184406  6/1987  United Kingdom ................ 180/220

Primary Examiner—Kenneth R. Rice
Assistant Examiner—Alan M. Kagen
Attorney, Agent, or Firm—Pitts and Brittian

[57] ABSTRACT

A reverse drive apparatus for a motorcycle is disclosed. The apparatus (10) includes a drive wheel (12) for releasably engaging a wheel (15) of the motorcycle (11). The drive wheel (12) is driven by an electric motor (16) which is powered by the motorcycle's battery. Support means (20) are provided for securing the electric motor (16) to a stationary portion, preferably the frame (22), of the motorcycle (11). The support means (20) include means for selectively moving the drive wheel (12) into and out of engagement with the driven wheel (15) of the motorcycle.

5 Claims, 3 Drawing Sheets

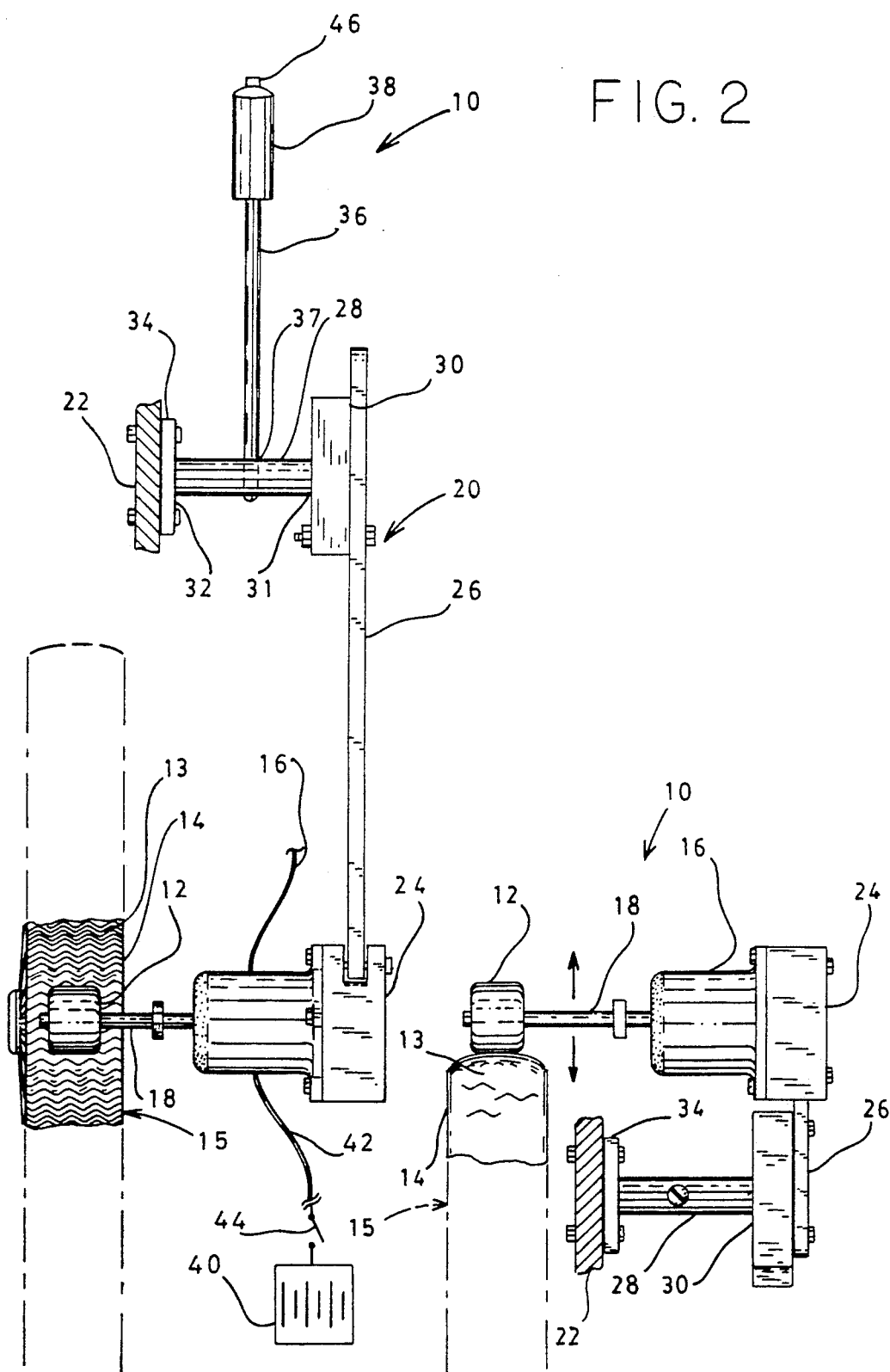

REVERSE DRIVE FOR A MOTORCYCLE

TECHNICAL FIELD

This invention relates to a reverse drive apparatus for a motorcycle.

BACKGROUND ART

Motorcycles have been in existence for many years. These self-propelled two wheel vehicles have found a great increase in popularity over the past few decades, for both recreational and transportation purposes. Motorcycles are typically propelled by a gasoline engine which drives the rear wheel of the motorcycle via a transmission and either a chain drive or a shaft drive.

Motorcycle transmissions are rarely provided with a reverse gear (for propelling the motorcycle backwards) for a variety of reasons, including safety, cost and the fact that conventional chain drives "free wheel" in the reverse direction and will not propel the motorcycle backwards when the direction of travel of the chain is reversed. For this reason, the operator must provide reverse propulsion when it is necessary, for example, backing the motorcycle out of a tight parking location, by "walking" the motorcycle backwards. While this is not a great problem for most operators with a small lightweight motorcycle, it can be with the larger, heavier motorcycles which have found increasing popularity in recent years. The problem is particularly exacerbated when the operator is a smaller person who lacks the strength and agility to propel a heavy motorcycle out of a downhill parking space while preventing it from tipping over, as it has a tendency to do in such situations. This is a problem which frequently faces many women motorcycle operators.

Therefore it is a primary object of the present invention to provide a reverse drive apparatus for a motorcycle which functions independently of the motorcycle's main powertrain.

It is another object of the present invention to provide a reverse drive apparatus for a motorcycle which is battery powered.

It is a further object of the present invention to provide a reverse drive apparatus for a motorcycle which can be adapted to a variety of different models of motorcycles.

It is still another object of the present invention to provide a reverse drive apparatus for a motorcycle which is simple and inexpensive to manufacture and install.

DISCLOSURE OF THE INVENTION

Other objects and advantages will be accomplished by the present invention which provides a reverse drive apparatus for a motorcycle. The apparatus includes a drive wheel for releasably engaging one of the motorcycle wheels (hereinafter the "driven wheel"), preferably the rear wheel. The drive wheel is driven by an electric motor via a drive shaft in a direction which rotates the driven wheel of the motorcycle in the direction which propels the motorcycle backwards when it is engaged by the drive wheel. The electric motor is powered by a battery, preferably by the battery which is normally used by the motorcycle for starting, ignition, and/or electrical accessories. Support means are provided for securing the electric motor to a stationary portion, preferably the frame, of the motorcycle. The support means include means for selectively moving the drive wheel into and out of engagement with the driven wheel.

BRIEF DESCRIPTION OF THE DRAWINGS

The above-mentioned features of the invention will become more clearly understood from the following detailed description read together with the drawings in which:

FIG. 2 illustrates a top view of a reverse drive apparatus for a motorcycle constructed in accordance with the various features of the present invention.

FIG. 3 illustrates a rear view of a reverse drive apparatus for a motorcycle constructed in accordance with the various features of the present invention.

BEST MODE FOR CARRYING OUT THE INVENTION

Figure 1:
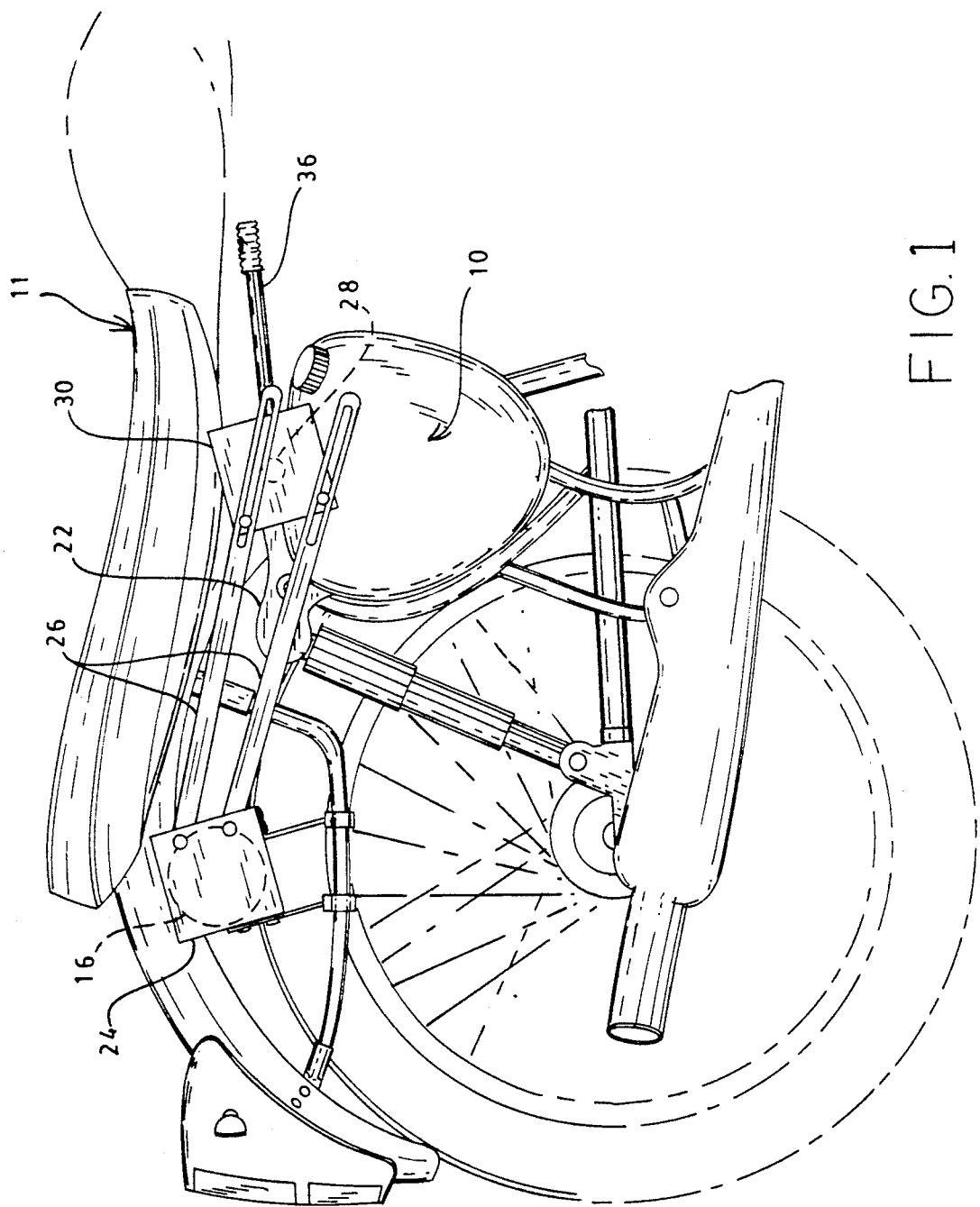
FIG. 1 illustrates a side elevation view of a reverse drive apparatus for a motorcycle constructed in accordance with the various features of the present invention. The apparatus is shown as it would appear as installed on a motorcycle, which is partially illustrated.

A reverse drive apparatus for a motorcycle, incorporating various features of the present invention, is illustrated at 10 in the figures. The apparatus 10 includes a drive wheel 12 for selectively engaging a selected portion of the tread 13 of the tire portion 14 of a wheel, preferably the rear wheel, (hereinafter the "driven wheel 15"), of a motorcycle 11. The drive wheel 12 is driven by a DC motor 16 via a drive shaft 18. It will be appreciated by those skilled in the art that a transmission can be provided between the motor 16 and the drive shaft 18 to improve transmission of motor torque to the drive wheel 12.

Support means, indicated generally at 20 in FIG. 2, are provided for securing the apparatus 10 to a suitable portion, preferably the frame 22, the motorcycle 11. Referring to FIGS. 2 and 3, the support means 20 includes a motor mounting plate 24 to which the motor 16 is fixedly secured, one or more support arms 26, and a shaft 28. The motor mounting plate 24 is supported by the support arms 26, to which it is secured. The support arms 26 are secured to an end plate 30 of the shaft 28. The end plate 30 is defined by or fixedly secured, e.g. by welding, to the first end portion 31 of the shaft 28. The support means 20 also includes a mounting coupling 34 for securing the support means to the frame 22 of the motorcycle 11. A second end portion 32 of the shaft 28 is rotatably received within the mounting coupling 34 which is fixedly secured, either by welding or other suitable fastening means, to the frame 22 of the motorcycle.

Means for selectively moving the drive wheel 12 into and out of engagement with the driven wheel 15 of the motorcycle 11 are provided by a handle or lever 36 which is fixedly secured, proximate its first end portion 37, to the shaft 28. In the illustrated embodiment, it can be seen that the lever 36 is positioned more or less horizontally. Referring to FIGS. 1 and 2, it can be seen that when the lever 36 is lifted up by its distal end portion 38, the apparatus 10, except for the mounting coupling 34, will be rotated counter clockwise, thereby forcing the drive wheel 12 into engagement with the driven wheel 15. Similarly, the drive wheel 12 can be disengaged by pushing down on the lever 36. In the preferred embodiment, means (not shown) can be provided for latching the lever 36 in the desired engaged or disengaged position.

The motor 16 is powered by a battery 40 via a cable 42. Preferably, the battery 40 is the same as that typically used by a motorcycle to power its starting and ignition circuits as well as any electrical accessories. Of course, the cable will be electrically connected such that the motor rotates in the direction necessary to cause the motorcycle to be propelled backwards when the drive wheel 12 engages the driven wheel 15. Switch means 44 are provided for selectively supplying power to the motor 16. It will be appreciated by those skilled in the art that the switch means 44 can be positioned in any convenient location on the motorcycle. For example, it can comprise a pushbutton switch mounted on the distal end 38 of the lever 36, as illustrated at 46, or it could be mounted proximate the handlebars of the motorcycle.

Figure 4A:
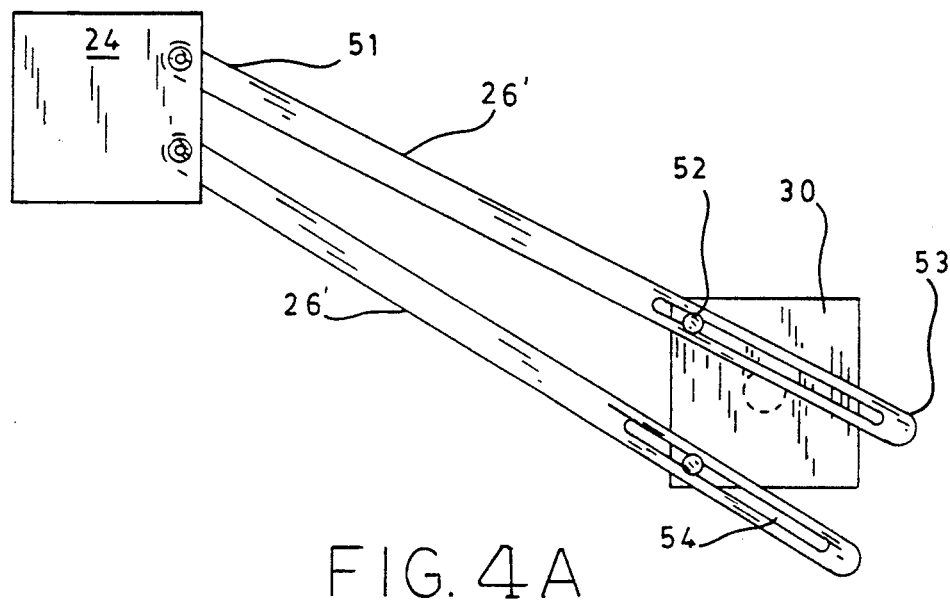
FIG. 4A illustrates a partial side elevation view of a reverse drive apparatus for a motorcycle constructed in accordance with the various features of the present invention.
Figure 4B:
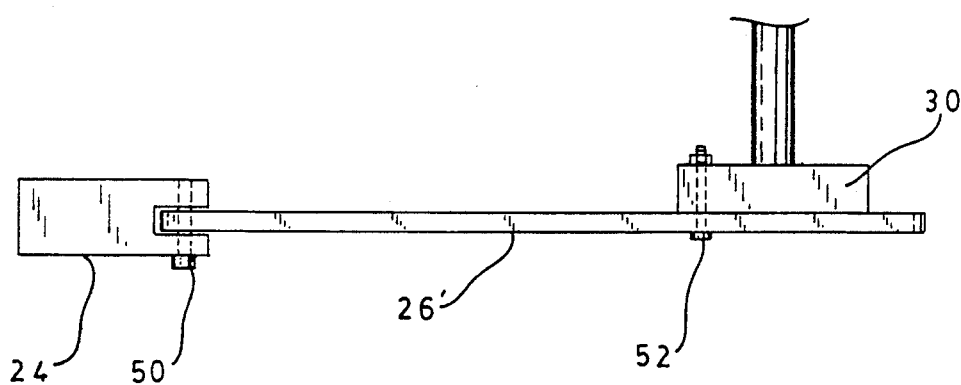
FIG. 4B illustrates a partial top view of a reverse drive apparatus for a motorcycle constructed in accordance with the various features of the present invention.

It will be appreciated by those skilled in the art that the support arms 26 must be dimensioned to accommodate the desired positioning of the motor 16 and the drive wheel 12 with respect to that of the shaft 28 which, of course, may vary from one model motorcycle to another. Referring to FIGS. 4A and 4B, it can be seen that an adjustable length support arm 26' is disclosed. The support arm 26' is pivotally secured to the motor mounting plate 24 by a suitable fastener 50 proximate its first end portion 51. The support arm 26' is slidably/fixedly secured to the end plate 30 of the shaft 28 by a releasable fastener 52, e.g. a bolt and nut, which extends through a slot-shaped opening 54 defined by the second end portion 53 of the support arm 26' into or through the end plate 30. The effective length of the arm 26' is adjusted by loosening the fastener 52 and positioning the arm 26' such that the fastener 52 extends through the slot 54 at a point nearer or further from the end portion 51 of the arm 26', as desired, and then retightening the fastener 52 to fixedly secure the arm 26' to the plate 30 in that desired position. Preferably, the fastener 50 is also releasable to permit the substitution of support arms 26' of various lengths having different ranges of adjustment, thereby giving the apparatus 10 an even wider range of applications.

In light of the foregoing, it can be seen that a reverse drive apparatus 10 for a motorcycle is provided. By actuating a lever 36, a drive wheel 12 engages the tire 14 of the rear wheel 15 of the motorcycle. The drive wheel 12 is driven by a DC electric motor 16 which is powered by the motorcycle's battery 40. The rotation of the motor is such that the motorcycle is propelled backwards when power is supplied by closing a switch 44 which may be positioned at a convenient location on the motorcycle. Further, the apparatus 10 can be used for a variety of applications, i.e. different models of motorcycles, by adjusting the effective lengths of the support arms 26'.

While a preferred embodiment has been shown and described, it will be understood that it is not intended to limit the invention to such disclosure, but rather it is intended to cover all modifications and alternate constructions falling within the scope of the invention as defined in the appended claims.

I claim:

1. A reverse drive apparatus for a motorcycle having at least a front and a rear wheel and a frame, one of said wheels defining a driven wheel which can be rotated by said apparatus in a direction tending to propel said motorcycle backwards, said wheels defining a tire portion having ground engaging tread, said apparatus comprising:

a drive wheel for releasably engaging the tread of said driven wheel;

a DC electric motor;

a drive shaft for connecting said motor to said drive wheel, whereby said drive wheel is selectively rotated when said motor is electrically connected to a DC electrical power source;

a DC electrical power source, said source being electrically connected to said motor such that said drive wheel is rotated in a direction tending to rotate said driven wheel in a direction tending to propel said motorcycle backwards when said driven wheel engages said driven wheel;

support means for securing said motor to said frame and for selectively moving said drive wheel into and out of engagement with said driven wheel, said support means including an actuator shaft having a first end portion rotatably secured to said frame and a second end portion, said actuator shaft carrying an actuating means for selectively rotating said actuator shaft, said support means further including at least one support arm which is adjustable in effective length, said support arm having a first end portion secured to said second end portion of said actuator shaft and a second end portion for engaging and supporting said motor, said first end portion of said support arm defining a longitudinally disposed slot-shaped opening and being provided with a releasable fastener for being received through said slot-shaped opening and securing said support arm to said actuator shaft at selected positions along said slot-shaped opening to adjust the effective length of said support arm, whereby selected rotation of said actuator shaft moves said drive wheel into and out of engagement with said driven wheel.

2. The reverse drive apparatus for a motorcycle of claim 1 wherein said driven wheel comprises the rear wheel of said motorcycle.

3. The reverse drive apparatus for a motorcycle of claim 1 wherein said motorcycle has a battery and said DC electrical power source comprises said battery.

4. The reverse drive apparatus of claim 1 wherein said actuating means includes a lever having a first end portion and a distal end portion, said first end portion being fixedly secured to said shaft such that said shaft can be selectively pivoted about the rotational axis of said actuator shaft. selected positions along said slot-shaped opening to adjust the effective length of said support arm.

5. The reverse drive apparatus of claim 1 wherein said support means includes two said support arms, each said support arm being pivotally secured to said motor.

* * * * *